Patented Feb. 20, 1934

1,947,452

UNITED STATES PATENT OFFICE 1,947,452

RESINATE COPPERIZED PAPER

William R. Barber, Albert G. Natwick, and Maurice W. Phelps, Camas, Wash., assignors to Crown Willamette Paper Company, San Francisco, Calif., a corporation of Delaware No Drawing. Application October 3, 1932
Serial No. 636,031

6 Claims. (Cl. 92—21)

The object of our invention is to incorporate a toxic agent—a chemical having fungicide, or bacteriacide, or both properties—specifically copper resinate in paper as manufactured, instead of introducing the toxic agent into the paper by the use of oil or wax.

The incorporation by dampening water of copper resinate into the stock from which the paper is to be made is impracticable. Dry copper resinate is insoluble and does not "wet" readily by water. It is a sticky powder greatly similar to powdered resin. It cannot be so dispersed in water that it can be successfully applied by the dampening method, and effect uniform distribution of the copper resinate, either on or in the sheet. Therefore, the fibers of the sheet would lack uniform toxicity. Besides, copper resinate specks on the surface of the finished sheet would detract from its appearance; and the sticky, undissolved particles of the copper resinate would tend to gum up the Fourdrinier paper machine wire, the paper machine clothing, and the calender rolls.

Our present invention has for its purpose the incorporation of a definite amount of copper resinate in manufactured paper by deposition on and in the fiber meshes of the paper; and to effect said incorporation by a simple and dependable process, causing the precipitation of copper resinate on, and the retention of the same by the fiber in the beater furnish. Thus to produce a paper which may be used for example as a plant cover, resisting deterioration and destruction of its fiber structure by cellulose consuming bacteria and fungi in soils; or as a fruit wrapper, preventing growth, propagation and spreading of spores of growing fungi bacteria and other parasitic agents destructive to and impairing the quality of fruits and vegetables during the interim between their harvesting and ultimate consumption.

The addition of dry copper resinate to the beater furnish is entirely impracticable, due to its non-wetting, sticky character. It fails to disperse in the fiber, leaves green copper resinate specks on the sheet, and tends to clog up the paper machine wire.

We discovered that precipitation of copper resinate in a definite quantity, from its constituent materials, on the fiber may be successfully accomplished thru the medium of rosin size as generally used in the beater, and the addition of soluble copper sulphate to the size, thereby forming insoluble copper resinate precipitate in and on the fiber; and our process may thus be carried out in the beater in the same way as the regular sizing of paper stock; the copper constituent material being substituted for the usual aluminum sulphate (alum).

Our procedure is as follows:

Let it be assumed that we use unbleached sulfite. To each ton of pulp we add 160 pounds of thick size, or other suitable size equivalent to about 112 pounds of dry size. The stock in the beater is then beaten for 30 minutes; then we add 40 pounds of copper sulphate in suitable water solution to the stock. The stock immediately turns light green. Beating is continued with the roll hard down for 15 to 20 minutes.

The above given proportions of size and copper sulfate approximate the theoretical amounts necessary for complete precipitation of copper resinate without any excess of copper sulfate. But, a slight excess of size is maintained with a back water pH of not less than 6.0. Maintenance of a slight excess of the size over copper sulfate is advisable for altho retention of the copper does not become quite so good as with excess of copper sulfate, danger of corrosion of the iron parts of the beater, pumps and lines and other mill equipment is avoided by a slight excess of size. And such copper as may come thru in the back water would be in the form of non-corrosive colloidal copper compounds.

The paper so prepared will contain an excess of the desired 1% per weight of copper resinate; that amount of copper resinate being considered necessary to impart to the paper sufficient resistance to the deterioration and destruction of its fiber, and give it the protective character as above mentioned. And in addition, the sheet will contain an excess of other copper compounds in the form of copper hydrate and copper carbonate. This excess of copper is natural, since some copper hydrate and copper carbonate are also deposited in the fiber.

The proportions above given are of course variable if a greater or lesser amount of copper resinate is to be incorporated in and retained by the paper fiber, and the beating periods are given approximately, in accordance with the best results obtained by us.

We claim:

1. A paper sheet characterized by the fiber thereof carrying a predetermined amount of fungicidal and/or bacteriacidal chemically precipitated copper compounds.

2. A paper sheet characterized by the fiber thereof carrying a predetermined amount of copper resinate precipitate.

3. A paper sheet characterized by the fiber thereof carrying a precipitate of copper resinate in not less than 1% by weight.

4. The process of incorporating a definite amount of copper resinate in the fiber of a paper sheet comprising the addition of copper sulfate solution to the beater furnish, including regular rosin size, from which the sheet is made, the rosin size and copper sulfate being relatively proportioned to precipitate a definite amount of copper resinate in and on the fiber, and then continuing the beating operation for a further period substantially as described.

5. The process of incorporating a definite amount of copper resinate in the fiber of a paper sheet comprising the addition of copper sulfate solution to the beater furnish, including regular rosin size, from which the sheet is made, the rosin size and copper sulfate being relatively proportioned to effect the precipitation of a definite amount of copper resinate in and on the fiber with an excess of rosin size, and then continuing the beating operation for a further period substantially as described.

6. The process of incorporating a definite amount of copper resinate in the fiber of a paper sheet comprising the addition of copper sulfate solution to the beater furnish, including regular rosin size, from which the sheet is made, the rosin size and copper sulfate being relatively proportioned to effect the precipitation of not less than 1% copper resinate in and on the fiber with an excess of rosin size and then continuing the beating operation for a further period substantially as described.

MAURICE W. PHELPS.
WILLIAM R. BARBER.
ALBERT G. NATWICK.